US012061521B1

United States Patent
Sukhwani et al.

(10) Patent No.: US 12,061,521 B1
(45) Date of Patent: Aug. 13, 2024

(54) NON-BLOCKING HARDWARE FUNCTION REQUEST RETRIES TO ADDRESS RESPONSE LATENCY VARIABILITIES

(71) Applicant: International Business Machines Corporation, Armonk, NY (US)

(72) Inventors: Bharat Sukhwani, Sudbury, MA (US); Sameh Asaad, Briarcliff Manor, NY (US); Mohit Kapur, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 18/299,430

(22) Filed: Apr. 12, 2023

(51) Int. Cl.
*G06F 11/14* (2006.01)
*G06F 11/07* (2006.01)

(52) U.S. Cl.
CPC ...... *G06F 11/1405* (2013.01); *G06F 11/0757* (2013.01)

(58) Field of Classification Search
CPC .......... G06F 11/1405; G06F 11/0757
See application file for complete search history.

(56) References Cited

U.S. PATENT DOCUMENTS

| | | | | |
|---|---|---|---|---|
| 5,553,258 | A * | 9/1996 | Godiwala | G06F 12/0833 |
| | | | | 711/212 |
| 7,353,484 | B1 | 4/2008 | Pritchard et al. | |
| 8,447,757 | B1 * | 5/2013 | Cox | G06F 9/5061 |
| | | | | 707/720 |
| 11,354,129 | B2 | 6/2022 | Branscome | |
| 2003/0101297 | A1 * | 5/2003 | Allen | G06F 13/376 |
| | | | | 710/107 |
| 2004/0024945 | A1 * | 2/2004 | Keller | G06F 13/161 |
| | | | | 710/305 |
| 2009/0327352 | A1 * | 12/2009 | Thomas | H04L 51/42 |
| 2014/0082410 | A1 * | 3/2014 | Ziakas | G06F 12/08 |
| | | | | 711/105 |
| 2014/0372791 | A1 * | 12/2014 | Adachi | G06F 11/1048 |
| | | | | 714/5.1 |
| 2019/0384528 | A1 * | 12/2019 | Grosz | G06F 3/0653 |
| 2022/0164268 | A1 * | 5/2022 | Bonitz | G06F 11/221 |
| 2024/0073094 | A1 * | 2/2024 | de Oliveira | H04L 67/34 |

OTHER PUBLICATIONS

Mamaghani "High-Level Synthesis of Elasticity: From Models to Circuits," Thesis, The University of Manchester, School of Computer Science, 2016, 160 pages. https://research.manchester.ac.uk/en/studentTheses/high-level-synthesis-of-elasticity-from-models-to-circuits.

* cited by examiner

*Primary Examiner* — Matthew M Kim
*Assistant Examiner* — Matthew N Putaraksa
(74) *Attorney, Agent, or Firm* — Yee & Associates, P.C.

(57) ABSTRACT

Managing hardware function requests incurring variable response latencies is provided. A request for a hardware function is received from a requesting program. The requested hardware function is expected to incur a variable response latency and is implemented as a main hardware function and a retry hardware function. The main hardware function is executed. It is determined whether a fixed response latency of the main hardware function has been exceeded. A response is returned with a retry flag to the requesting program. The retry flag directs the requesting program to issue a request for the retry hardware function after an interval of time. A unique identifier corresponding to the main hardware function is provided to the requesting program.

20 Claims, 5 Drawing Sheets

NON-BLOCKING HARDWARE FUNCTION REQUEST RETRIES TO ADDRESS RESPONSE LATENCY VARIABILITIES

BACKGROUND

The disclosure relates generally to hardware functions and more specifically to managing hardware function requests.

Typically, functions implemented in hardware (i.e., hardware functions) have predictable response latencies. This enables high-throughput processing using paradigms, such as, for example, pipelining and streaming, where data to be processed moves or streams over a number of computational stages with predictable response latencies. In certain cases, response latencies of data processing or data fetches can be variable. For example, accessing off-chip dynamic random-access memory or storage to fetch data can have variable response times.

SUMMARY

According to one illustrative embodiment, a computer-implemented method for managing hardware function requests incurring variable response latencies is provided. A hardware function receives a request for the hardware function from a requesting program. The hardware function is expected to incur a variable response latency and is implemented as a main hardware function and a retry hardware function. The hardware function executes the main hardware function. The hardware function determines whether a fixed response latency of the main hardware function has been exceeded. The hardware function returns a response with a retry flag to the requesting program. The retry flag directs the requesting program to issue a request for the retry hardware function after an interval of time. The hardware function provides a unique identifier corresponding to the main hardware function to the requesting program. According to other illustrative embodiments, a computer system and computer program product for managing hardware function requests incurring variable response latencies are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
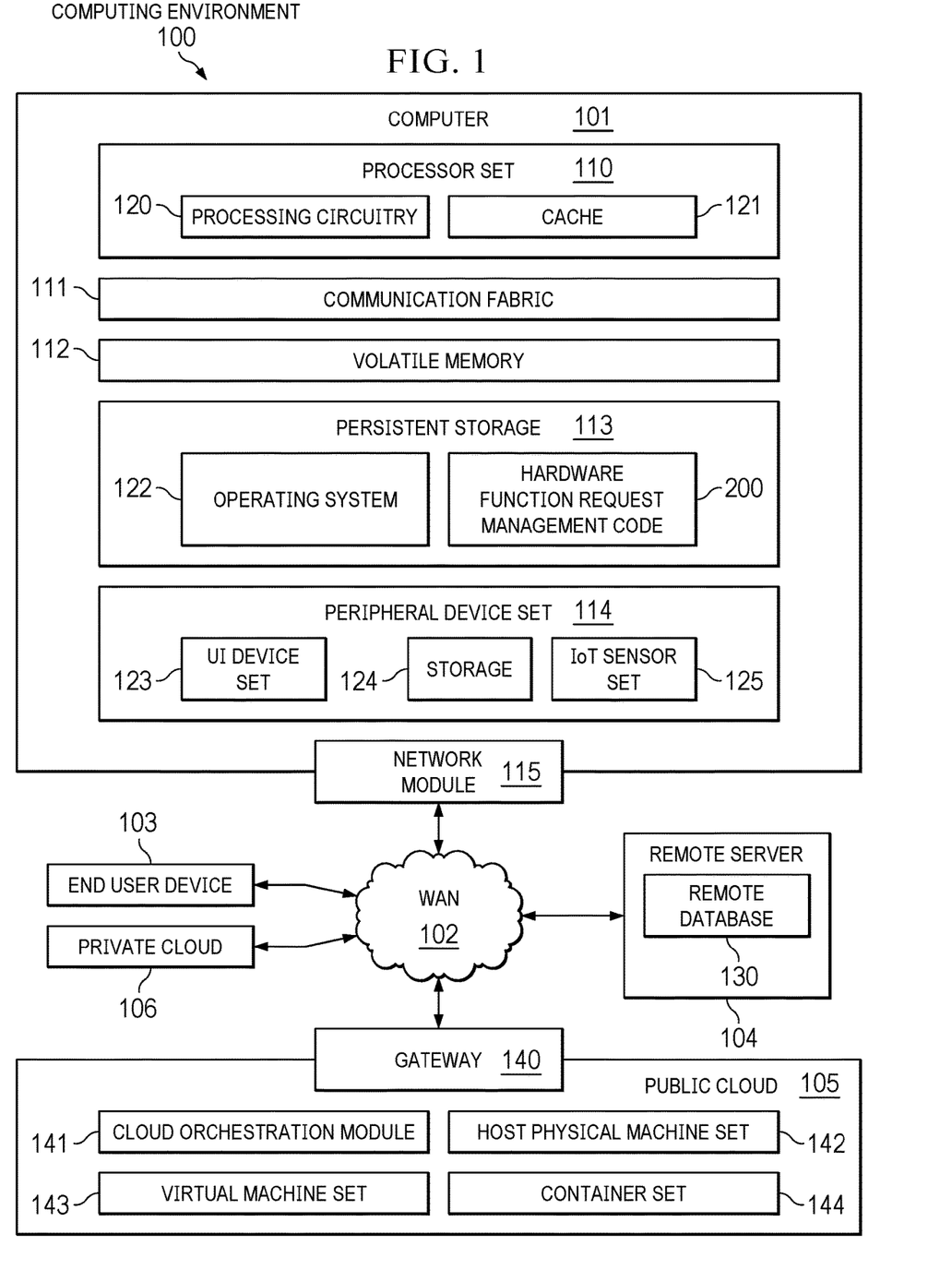
FIG. 1 is a pictorial representation of a computing environment in which illustrative embodiments may be implemented.
Figure 2:
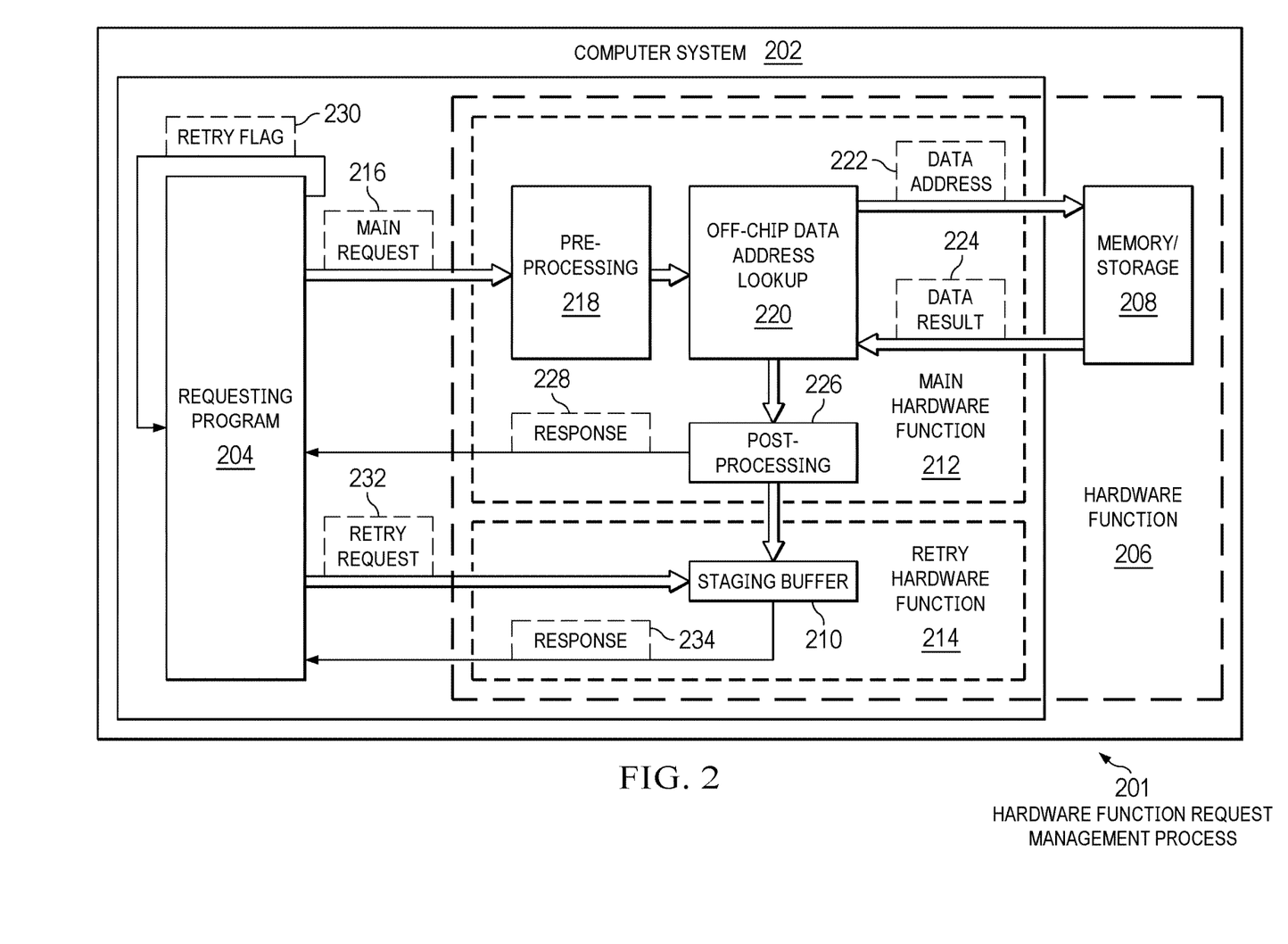
FIG. 2 is a diagram illustrating an example of a hardware function request management process in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as hardware function request management code 200. For example, hardware function request management code 200 is capable of issuing non-blocking retries of hardware function requests to handle variable response latencies of hardware functions for requesting programs that have strict fixed-latency response requirements.

In addition to hardware function request management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and hardware function request management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in hardware function request management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. Hardware function request management code 200 includes at least some of the computer code involved in performing the inventive methods of illustrative embodiments.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (for example, a program developer, system administrator, or the like corresponding to an entity that operates computer 101), and may take any of the forms discussed above in connection with computer 101. EUD 103 typically receives helpful and useful data from the operations of computer 101. For example, in a hypothetical case where computer 101 is designed to provide a response latency recommendation to the end user, this recommendation would typically be communicated from network module 115 of computer 101 through WAN 102 to EUD 103. In this way, EUD 103 can display, or otherwise present, the response latency recommendation to the end user. In some embodiments, EUD 103 may be a client device, such as thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a response latency recommendation based on historical response latency data, then this response latency historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Certain systems, programs, or applications, which are requesters, callers, or invokers of hardware functions, have strict fixed-latency response requirements. A hardware function as defined herein is a function, an algorithm, a computation, or other operation that is implemented using logic gates or the equivalent in an Application Specific Integrated Circuit (ASIC), a Field Programmable Gate Array (FPGA), or similar devices. A strict fixed-latency response requirement means that the requested hardware function must return a response to the requester after exactly a fixed latency (e.g., a fixed amount of time before transfer of data begins following the request for the transfer of the data from the hardware function). One current solution to variable response latencies of hardware functions is to set the response latency of the requested hardware function based on its worst-case response latency. Using this current solution, all requests are responded to after the worst-case response latency (i.e., results are available after the average response latency, but the results are delayed for an additional amount of time until the worst-case response latency is reached). It should be noted that the worst-case response latency is significantly greater than the average response latency. Using this current solution, a percentage of hardware function requests having long response latencies penalize other hardware function requests having an average response latency (e.g., blocking subsequent requests to the hardware function, which can significantly decrease overall system throughput) making this current solution sub-optimal. For example, in a network packet processing pipeline, one blocking packet can lead to network congestion, increased network latency, and decreased network performance.

Furthermore, issues increase with programs having strict fixed-latency response requirements (e.g., a P4 program in network packet processing). P4 is a network programming language that specifies how packets are processed by the data plane of a programmable network forwarding element (e.g., hardware or software switches, network interface cards, routers, network function appliances, and the like). An extern is an external function that is implemented outside the P4 program. In certain implementations, externs are expected to complete in a fixed number of cycles, no sooner, no later. However, an extern that accesses external memory (e.g., DRAM) may not satisfy this expectancy (i.e., may not complete in the fixed number of cycles).

Typically, the response time of hardware functions that have variable response latencies follow a bell curve with a long tail. This bell curve with a long tail illustrates that a vast percentage of the hardware function requests have an average response latency, while only a small percentage of requests for the hardware function have long response latencies. Implementation of such hardware functions having variable response latencies involves designing for the average response latency, while providing a mechanism to handle outlier long response latencies.

As a result, illustrative embodiments split the hardware functions having variable response latencies into two hardware functions with fixed response latencies. For example, illustrative embodiments partition a hardware function that has a variable response latency into separate hardware function (i.e., a "main" hardware function and a "retry" hardware function, each hardware function having its own separate, fixed response latency). The fixed latency of the main hardware function is set equal to the average response latency of the called hardware function, while the retry hardware function has a set retry latency that is less than the fixed latency of the main hardware function. By utilizing this retry hardware function, illustrative embodiments avoid the need for setting the average response latency equal to the worst-case response latency, while providing support for worst-case response latency scenarios using the additional smaller response latency of the retry hardware function.

Mechanisms for handling variable response latencies currently exist. For example, token-based requests and response handshakes can handle variable response latencies of hardware functions. However, this mechanism needs to maintain the context of multiple outstanding hardware function requests, which decreases overall system performance and adds complexity to the system. In addition, this mechanism does not allow for strict fixed-latency completion of the hardware function. Also, bus protocols, such as, for example, PCIe, allow for retries, but these retries are essentially a new hardware function request having the same or similar response latency as the original hardware function request. Further, these retries by bus protocols do not address a long tail latency or guarantee a fixed-latency response.

Illustrative embodiments differ from the mechanisms mentioned above. For example, the retry hardware function request of illustrative embodiments is non-blocking. This means that when an original hardware function request cannot be fulfilled in the strict fixed-latency response requirement of the requester, illustrative embodiments mark the response of the original hardware function request with a retry flag or bit and queue the original hardware function request for re-injection into the pipeline at a later time with the retry flag, while the hardware function continues to process subsequent new requests without being blocked by the original pending request. In other words, other requesters can call the hardware function while the previous original request is still pending. Illustrative embodiments can introduce the new requests for the hardware function before the retry hardware function request or in between retry requests when a result still has not been achieved by the hardware function after the first retry request. As a result, illustrative embodiments do not need to maintain the context of each outstanding hardware function request. Instead, illustrative embodiments return a response to the requester after the fixed latency response time whether the task is completed or not.

Subsequently, illustrative embodiments re-issue the pending original request as a new hardware function request with the retry flag set. Illustrative embodiments are unlike existing hardware function retry mechanisms where a retry is essentially a new hardware function request having the same or similar response latency as before. In other words, existing hardware function retry mechanisms repeat the complete sequence of servicing a hardware function request, including issuing new data fetch requests from memory or network, leading to a retry response latency that is the same or similar to the response latency of the original hardware function request. This leads to an overall longer total response latency for completing the hardware function request (e.g., total response latency=T1+T2, where T1 is the response latency of the original hardware function request and T2 is the response latency of the retry hardware function request, and T2 is equal or similar to T1), which decreases system performance. Illustrative embodiments handle the retry hardware function request differently from the original main hardware function request, which leads to a smaller total response latency (e.g., total response latency=T1+r, where r is the response latency of the retry hardware function request, and r is less than T1 and T2). In other words, the retry hardware function has a smaller response latency than the response latency of the main hardware function. Illustrative embodiments process long tail response latencies in the background, while illustrative embodiments allow new requests for the hardware function to proceed non-blocked. In other words, illustrative embodiments hide the long tail response latency behind other requests for the hardware function.

Illustrative embodiments split variable response latencies of hardware functions into one or more fixed-latency hardware function requests (i.e., the main hardware function request followed by optional one or more retry hardware function requests). The response latency of the main hardware function is set equal to, substantially equal to, or similar to the average response latency of that particular hardware function. It should be noted that a user, such as, for example, a program developer, hardware developer, system administrator, or the like, sets the response latencies. The user can set the response latency of the main and retry hardware functions based on, for example, system workload.

For cases where a hardware function evaluation takes longer than the fixed-latency, which is set to the average response latency, for that particular hardware function, illustrative embodiments return a response for that particular hardware function after the fixed-latency with the retry flag directing the requester of the hardware function to issue a request to the retry hardware function at a later time (e.g., after a defined interval of time or after some other criteria for issuing the retry request is met), and optionally include a tag in the response that uniquely identifies the main hardware function request executing in the background. While the response with the retry flag is returned to the requester of the hardware function, illustrative embodiments continue the execution of the main hardware function request in the background until a result has been attained from the hardware function (e.g., until DRAM returns data corresponding to a fetch request and the data has been further processed, if needed, to achieve a final result). After the result is attained from the hardware function and is ready to be returned to the requester of the hardware function, illustrative embodiments place the result in a separate local staging buffer for faster lookup and response while processing the retry hardware function request.

From the perspective of the hardware function requester, a response corresponding to the main hardware function request is received after the fixed-latency, which is set to the average response latency, whether the response is the result or the retry flag. If the requester receives the result (e.g., requested dataset) in the response, then the requester consumes the result and continues with further processing if needed. Conversely, if the requester receives the retry flag in the response instead of the result, then the requester issues a retry hardware function request. While processing a hardware function request, illustrative embodiments determine whether to invoke the main hardware function or the retry hardware function. With the retry flag set, illustrative embodiments invoke the retry hardware function (optionally with the tag uniquely identifying the main hardware function request executing in the background). The response latency of the retry hardware function is fixed and is set less than the fixed-latency of the main hardware function, which is set to the average response latency. The retry hardware function, when invoked, reads the attained result stored in the local staging buffer and returns the result at the set retry response latency. This retry by injecting the retry hardware function request of illustrative embodiments into the pipeline results in worst-case response latencies being absorbed in the background while other hardware function requests continue to be processed unblocked, thereby mitigating the adverse effects of long tail response latencies on the performance of the overall system.

Thus, illustrative embodiments provide one or more technical solutions that overcome a technical problem with blocked hardware function requests due to hardware functions having variable response latencies that exceed the strict fixed-latency response requirements of requesting programs. As a result, these one or more technical solutions provide a technical effect and practical application in the field of hardware functions.

With reference now to FIG. 2, a diagram illustrating an example of a hardware function request management process is depicted in accordance with an illustrative embodiment. Hardware function request management process 201 is implemented in computer system 202, such as, for example, computer 101 in FIG. 1.

In this example, computer system 202 includes requesting program 204, hardware function 206, memory/storage 208, and staging buffer 210. It should be noted that requesting program 204, hardware function 206, memory/storage 208, and staging buffer 210 can be implemented in hardware. Requesting program 204 can be any type of software program or application, such as a P4 program, or another hardware function, that has a strict fixed-latency response requirement. Requesting program 204 requests performance of a set of external functions implemented in hardware, such as hardware function 206. Hardware function 206 can perform any type of task, activity, or action (e.g., fetch data, process data, or the like) corresponding to the particular type of hardware, such as memory/storage 208, and provide a result. However, it should be noted that computer system 202 is intended as an example only and not as a limitation on illustrative embodiments. For example, computer system 202 can include any number of programs, hardware components, hardware functions, and other devices and components not shown.

In this example, hardware function 206 has variable response latencies. As a result, hardware function 206 has been implemented as main hardware function 212 and retry hardware function 214. Main hardware function 212 has a fixed response latency set to the average response latency of hardware function 206. However, it should be noted that a user, such as, for example, a program developer, hardware developer, system administrator, or the like, can set the response latency corresponding to main hardware function 212 based on the workload. Retry hardware function 214 has a fixed response latency that is much smaller than the fixed response latency of main hardware function 212. The user can set the response latency of retry hardware function 214 to, for example, 0.25, 0.50, 0.75, or the like of the fixed response latency of main hardware function 212. For example, if the user fixed the response latency of main hardware function 212 at 100 milliseconds, then the user can set the retry response latency at, for example, 25 milliseconds, 50 milliseconds, 75 milliseconds, or any other amount of time based on workload. However, it should be noted that these response latencies above are intended as examples only and not as limitations on illustrative embodiments.

Requesting program 204 issues main request 216 for performance of main hardware function 212. In this example, main request 216 is for fetching a particular dataset from memory/storage 208. At 218, main hardware function 212 performs pre-processing of main request 216. At 220, main hardware function 212 sends data address 222 to memory/storage 208 to perform an off-chip data address lookup for that particular dataset. Memory/storage 208 fetches that particular dataset and returns data result 224. At 226, main hardware function 212 performs post-processing of data result 224, if needed. Afterward, main hardware function 212 sends response 228, which includes data result 224, to requesting program 204, if main hardware function 212 was able to attain data result 224 prior to the fixed response latency of main hardware function 212 being exceeded. If main hardware function 212 was not able to attain data result 224 prior to the fixed response latency of main hardware function 212 being exceeded, then main hardware function 212 instead sends response 228 with retry flag 230 to requesting program 204. Retry flag 230 indicates to requesting program 204 to issue retry request 232 after an interval of time defined by a set of criteria, where this set of criteria is not specific and fixed but can be program dependent. In addition, main hardware function 212 continues execution in the background until data result 224 is attained even though the fixed response latency of main hardware function 212 has been exceeded. When main hardware function 212 attains data result 224, main hardware function 212 places data result 224 in staging buffer 210 for later retrieval during execution of retry hardware function 214.

Further, requesting program 204 or other requesting programs continue to issue subsequent requests for other datasets from memory/storage 208 unblocked even though main request 216 is still pending. When the set of criteria for issuing retry request 232 has been met, requesting program 204 issues retry request 232. Retry hardware function 214 executes retry request 232 and retrieves data result 224 from staging buffer 210. Retry hardware function 214 sends response 234, which includes data result 224 retrieved from staging buffer 210, at the set retry response latency of retry hardware function 214.

Figure 3:
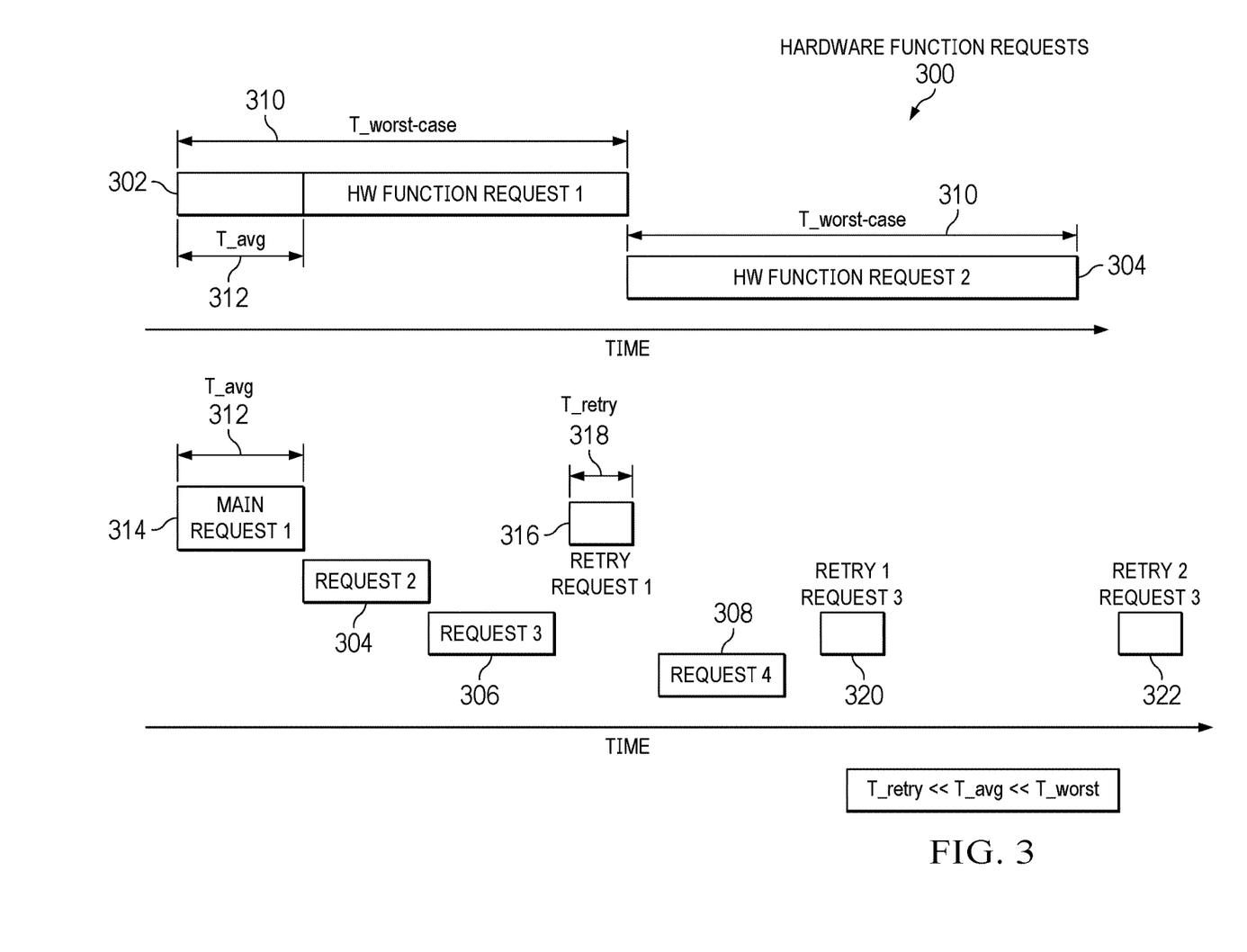
FIG. 3 is a diagram illustrating an example of hardware function requests in accordance with an illustrative embodiment.

With reference now to FIG. 3, a diagram illustrating an example of hardware function requests is depicted in accordance with an illustrative embodiment. Hardware function requests 300 can be implemented in a computer, such as, for example, computer 101 in FIG. 1 or computer system 202 in FIG. 2.

In this example, hardware function requests 300 include hardware request 1 302, hardware request 2 304, hardware request 3 306, and hardware request 4 308. Hardware request 1 302, hardware request 2 304, hardware request 3 306, and hardware request 4 308 are requests generated by a requesting program, such as, for example, requesting program 204 in FIG. 2, for a particular hardware function, such as, for example, hardware function 206 in FIG. 2, to perform different tasks. However, it should be noted that hardware function requests 300 are intended as examples only and not as a limitation on illustrative embodiments. For example, the computer can process any number of hardware function requests over time.

T_worst-case 310 represents the worst-case response latency of that particular hardware function. T_avg 312 represents the average response latency of that particular hardware function. Also, in this example, that particular hardware function has a variable response latency. As a result, hardware request 1 302 includes main hardware function request 1 314 and retry hardware function request 1 316. Main hardware function request 1 314 has a fixed response latency, which a user set to the average response latency (i.e., T_avg 312) of that particular hardware function. Retry hardware function request 1 316 has a set retry response latency of T_retry 318. T_retry 318 is much less than T_avg 312, which is much less than T_worst-case 310, as shown in this example.

Further in this example, hardware request 3 306 is split into a main hardware request followed by retry 1 of hardware request 3 306 and retry 2 of hardware request 3 306. The response latency of main hardware request 3 306 is fixed at T_avg 312 similar to main hardware request 1 314. In addition, the response latency of retry 1 and retry 2 of hardware request 3 306 is set to T_retry 318 similar to retry hardware function request 1 316. In FIG. 3, the timeline on the top shows how hardware function requests are issued without using the process of illustrative embodiments, where the response latency has been set equal to the worst-case response latency. The timeline on the bottom shows how the hardware function requests are issued using the process of illustrative embodiments. As is evident from the example shown in FIG. 3, the process of illustrative embodiments is able to issue and process many more requests to the hardware function in the same amount of time as compared to the timeline on the left that does not employ the process of illustrative embodiments. Thus, illustrative embodiments are able to address the fixed-latency response requirement of the requesting program in a more efficient manner than current solutions that set the response latency value equal to the worst-case response latency.

Figure 4A:
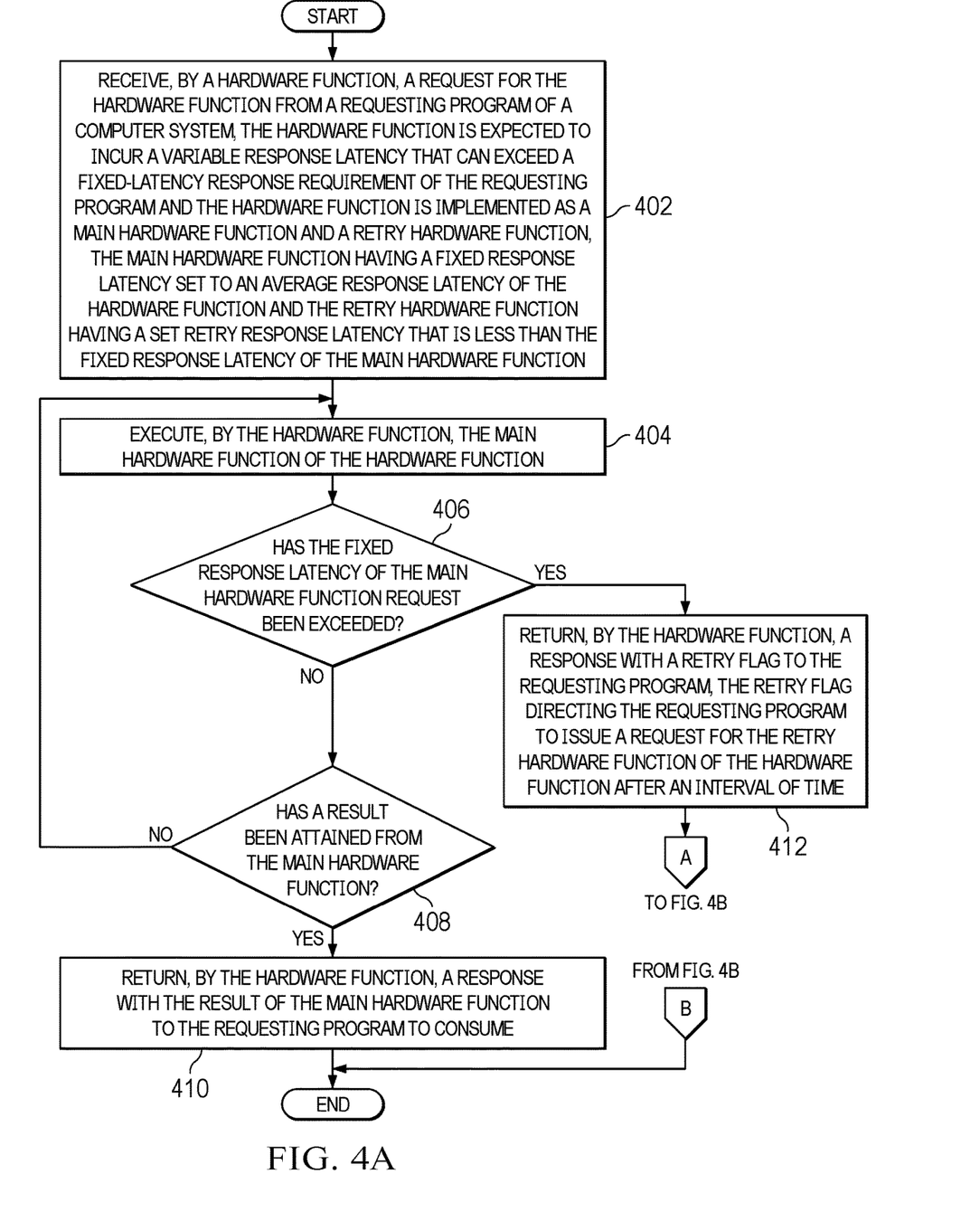
FIGS. 4A-4B are a flowchart illustrating a process for managing hardware function requests incurring variable response latencies in accordance with an illustrative embodiment.
Figure 4B:
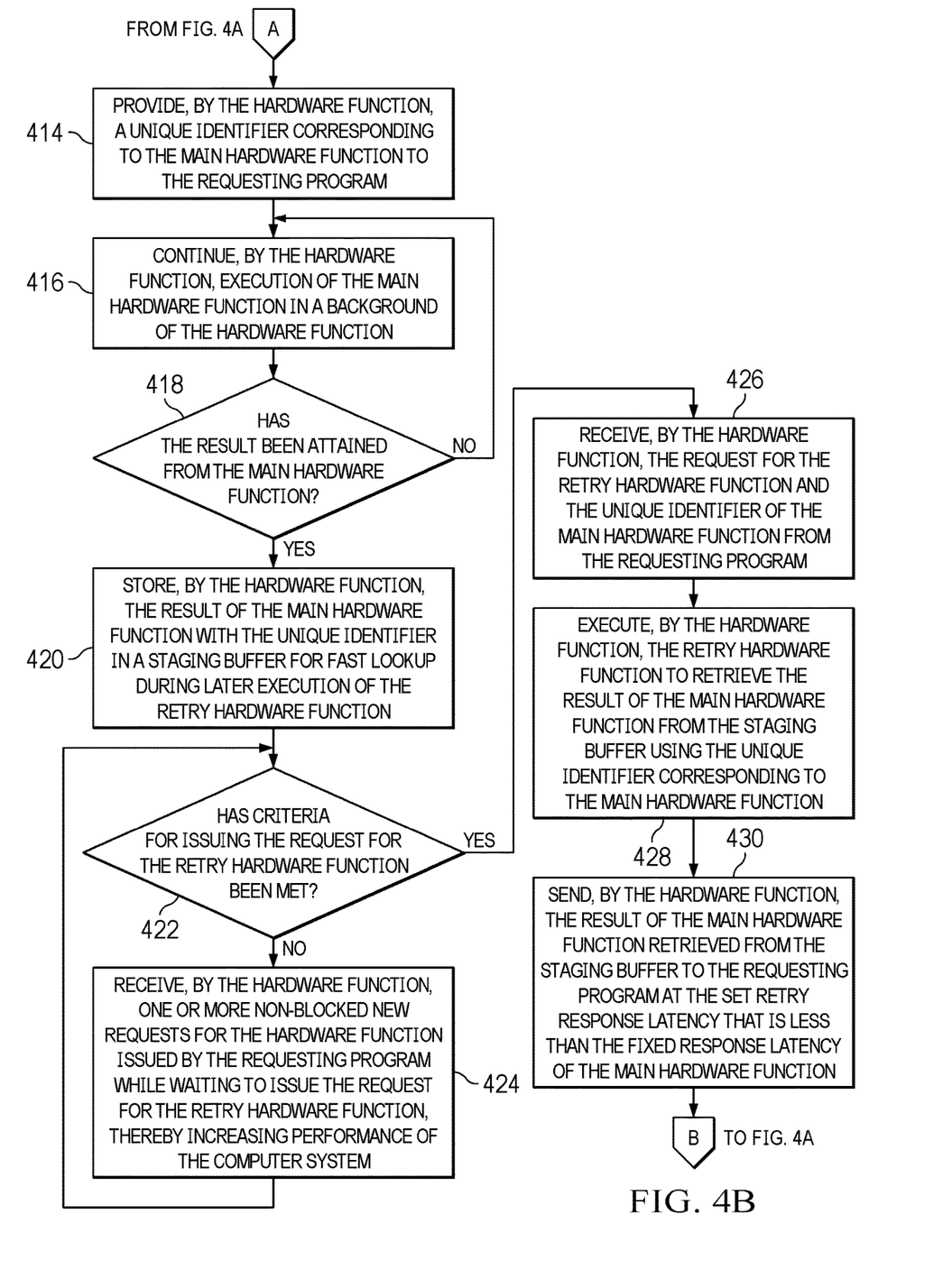

With reference now to FIGS. 4A-4B, a flowchart illustrating a process for managing hardware function requests incurring variable response latencies is shown in accordance with an illustrative embodiment. The process shown in FIGS. 4A-4B may be implemented in a computer system, such as, for example, computer 101 in FIG. 1 or computer system 202 in FIG. 2. For example, the process shown in FIGS. 4A-4B may be implemented in hardware function request management code 200 in FIG. 1.

The process begins when a hardware function of the computer system receives a request for the hardware function from a requesting program of the computer system (step 402). The requested hardware function is expected to incur a variable response latency that can exceed a fixed-latency response requirement of the requesting program. The requested hardware function is implemented as a main hardware function and a retry hardware function. The main hardware function has a fixed response latency set to an average response latency of the requested hardware function. The retry hardware function has a set retry response latency that is less than the fixed response latency of the main hardware function.

In response to receiving the request, the requested hardware function executes the main hardware function of the requested hardware function (step 404). Afterward, the requested hardware function makes a determination as to whether the fixed response latency of the main hardware function request has been exceeded (step 406). If the requested hardware function determines that the fixed response latency of the main hardware function request has not been exceeded, no output of step 406, then the requested hardware function makes a determination as to whether a result has been attained from the main hardware function corresponding to the request (step 408).

If the requested hardware function determines that a result has not been attained from the main hardware function, no output of step 408, then the process returns to step 404 where the requested hardware function continues to execute the main hardware function. If the requested hardware function determines that the result has been attained from the main hardware function, yes output of step 408, then the requested hardware function returns a response with the result of the main hardware function to the requesting program to consume (step 410). Thereafter, the process terminates.

Returning again to step 406, if the requested hardware function determines that the fixed response latency of the main hardware function has been exceeded, yes output of step 406, then the requested hardware function returns a response with a retry flag to the requesting program (step 412). The retry flag directs the requesting program to issue a request for the retry hardware function of the requested hardware function after an interval of time. The requested hardware function also provides a unique identifier corresponding to the main hardware function to the requesting program (step 414). In addition, the requested hardware function continues execution of the main hardware function in a background of the requested hardware function until the result is attained from the main hardware function (step 416).

Subsequently, the requested hardware function makes a determination as to whether the result has been attained from the main hardware function (step 418). If the requested hardware function determines that the result has not been attained from the main hardware function, no output of step 418, then the process returns to step 416 where the requested hardware function continues the execution of the main hardware function in the background. If the requested hardware function determines that the result has been attained from the main hardware function, yes output of step 418, then the requested hardware function stores the result of the main hardware function with the unique identifier of the main hardware function in a staging buffer for fast lookup during later execution of the retry hardware function (step 420).

Afterward, the requesting program makes a determination as to whether criteria for issuing the request for the retry hardware function has been met (step 422). It should be noted that the criteria for issuing the request for the retry hardware function can be program dependent. For example, if desired, the requesting program can immediately issue the request upon receiving the initial response with the retry flag. If the requesting program determines that the criteria for issuing the request for the retry hardware function has not been met, no output of step 422, then the requested hardware function receives one or more non-blocked new requests issued from the requesting program while waiting to issue the request for retry hardware function, thereby increasing performance of the computer system (step 424). Thereafter, the process returns to step 422 where the requesting program waits for the criteria to be met. If the requesting program determines that the criteria for issuing the request for the retry hardware function has been met, yes output of step 422, then the requested hardware function receives the request for the retry hardware function and the unique identifier of the main hardware function from the requesting program (step 426).

In response to receiving the request for the retry hardware function and the unique identifier of the main hardware function from the requesting program, the requested hardware function executes the retry hardware function to retrieve the result of the main hardware function from the staging buffer using the unique identifier corresponding to the main hardware function (step 428). The requested hardware function sends the result of the main hardware function retrieved from the staging buffer to the requesting program at the set retry response latency that is less than the fixed response latency of the main hardware function (step 430). Thereafter, the process terminates.

Thus, illustrative embodiments of the present disclosure provide a computer-implemented method, computer system, and computer program product for issuing non-blocking retries of hardware function requests to handle variable response latencies of hardware functions for requesting system programs that have strict fixed-latency response requirements. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing hardware function requests incurring variable response latencies, the computer-implemented method comprising:

receiving, by a hardware function, a request for the hardware function from a requesting program, the hardware function is expected to incur a variable response latency and is implemented as a main hardware function and a retry hardware function;

executing, by the hardware function, the main hardware function;

determining, by the hardware function, whether a fixed response latency of the main hardware function has been exceeded;

returning, by the hardware function, a response with a retry flag to the requesting program, the retry flag directing the requesting program to issue a request for the retry hardware function after an interval of time; and providing, by the hardware function, a unique identifier corresponding to the main hardware function to the requesting program.

2. The computer-implemented method of claim 1, further comprising:

continuing, by the hardware function, execution of the main hardware function in a background until a result is attained from the main hardware function;

determining, by the hardware function, whether the result has been attained from the main hardware function; and storing, by the hardware function, the result of the main hardware function with the unique identifier of the main hardware function in a staging buffer for fast lookup during later execution of the retry hardware function in response to the hardware function determining that the result has been attained from the main hardware function.

3. The computer-implemented method of claim 2, further comprising:

determining, by the requesting program, whether criteria for issuing the request for the retry hardware function has been met; and receiving, by the hardware function, one or more non-blocked new hardware function requests for the hardware function issued from the requesting program while waiting to issue the request for the retry hardware function thereby increasing performance in response to the requesting program determining that the criteria for issuing the request for the retry hardware function has not been met.

4. The computer-implemented method of claim 3, further comprising:
  receiving, by the hardware function, the request for the retry hardware function and the unique identifier of the main hardware function from the requesting program in response to the requesting program determining that the criteria for issuing the request for the retry hardware function has been met;
  executing, by the hardware function, the retry hardware function to retrieve the result of the main hardware function from the staging buffer using the unique identifier corresponding to the main hardware function in response to receiving the request for the retry hardware function and the unique identifier of the main hardware function from the requesting program; and
  sending, by the hardware function, the result of the main hardware function retrieved from the staging buffer to the requesting program.

5. The computer-implemented method of claim 4, further comprising:
  determining, by the hardware function, whether the result has been attained from the main hardware function in response to the hardware function determining that the fixed response latency of the main hardware function has not been exceeded; and
  returning, by the hardware function, a response with the result of the main hardware function to the requesting program to consume in response to the hardware function determining that the result has been attained from the main hardware function.

6. The computer-implemented method of claim 1, wherein the variable response latency of the hardware function can exceed a fixed-latency response requirement of the requesting program.

7. The computer-implemented method of claim 1, wherein the main hardware function has the fixed response latency set to an average response latency of the hardware function, and wherein the retry hardware function has a set retry response latency that is less than the fixed response latency of the main hardware function.

8. A computer system for managing hardware function requests incurring variable response latencies, the computer system comprising:
  a communication fabric;
  a storage device connected to the communication fabric, wherein the storage device stores program instructions; and
  a processor connected to the communication fabric, wherein the processor executes the program instructions to:
    receive a request for a hardware function from a requesting program, the hardware function is expected to incur a variable response latency and is implemented as a main hardware function and a retry hardware function;
    execute the main hardware function;
    determine whether a fixed response latency of the main hardware function has been exceeded;
    return a response with a retry flag to the requesting program, the retry flag directing the requesting program to issue a request for the retry hardware function after an interval of time; and
    provide a unique identifier corresponding to the main hardware function to the requesting program.

9. The computer system of claim 8, wherein the processor further executes program instructions to:
  continue execution of the main hardware function in a background until a result is attained from the main hardware function;
  determine whether the result has been attained from the main hardware function; and
  store the result of the main hardware function with the unique identifier of the main hardware function in a staging buffer for fast lookup during later execution of the retry hardware function in response to determining that the result has been attained from the main hardware function.

10. The computer system of claim 9, wherein the processor further executes program instructions to:
  determine whether criteria for issuing the request for the retry hardware function has been met; and
  receive one or more non-blocked new hardware function requests for the hardware function issued from the requesting program while waiting to issue the request for the retry hardware function thereby increasing performance in response to determining that the criteria for issuing the request for the retry hardware function has not been met.

11. The computer system of claim 10, wherein the processor further executes program instructions to:
  receive the request for the retry hardware function and the unique identifier of the main hardware function from the requesting program in response to determining that the criteria for issuing the request for the retry hardware function has been met;
  execute the retry hardware function to retrieve the result of the main hardware function from the staging buffer using the unique identifier corresponding to the main hardware function in response to receiving the request for the retry hardware function and the unique identifier of the main hardware function; and
  send the result of the main hardware function retrieved from the staging buffer to the requesting program.

12. The computer system of claim 11, wherein the processor further executes program instructions to:
  determine whether the result has been attained from the main hardware function in response to determining that the fixed response latency of the main hardware function has not been exceeded; and
  return a response with the result of the main hardware function to the requesting program to consume in response to determining that the result has been attained from the main hardware function.

13. The computer system of claim 8, wherein the main hardware function has the fixed response latency set to an average response latency of the hardware function, and wherein the retry hardware function has a set retry response latency that is less than the fixed response latency of the main hardware function.

14. A computer program product for managing hardware function requests incurring variable response latencies, the computer program product comprising a computer-readable storage medium having program instructions embodied therewith, the program instructions executable by a computer system to cause the computer system to:
  receive, by a hardware function, a request for the hardware function from a requesting program, the hardware function is expected to incur a variable response latency and is implemented as a main hardware function and a retry hardware function;
  execute, by the hardware function, the main hardware function;

determine, by the hardware function, whether a fixed response latency of the main hardware function has been exceeded;

return, by the hardware function, a response with a retry flag to the requesting program, the retry flag directing the requesting program to issue a request for the retry hardware function after an interval of time; and provide, by the hardware function, a unique identifier corresponding to the main hardware function to the requesting program.

15. The computer program product of claim 14, wherein the program instructions further cause the computer system to:

continue, by the hardware function, execution of the main hardware function in a background until a result is attained from the main hardware function;

determine, by the hardware function, whether the result has been attained from the main hardware function; and store, by the hardware function, the result of the main hardware function with the unique identifier of the main hardware function in a staging buffer for fast lookup during later execution of the retry hardware function in response to the hardware function determining that the result has been attained from the main hardware function.

16. The computer program product of claim 15, wherein the program instructions further cause the computer system to:

determine, by the requesting program, whether criteria for issuing the request for the retry hardware function has been met; and receive, by the hardware function, one or more non-blocked new hardware function requests for the hardware function issued from the requesting program while waiting to issue the request for the retry hardware function thereby increasing performance in response to the requesting program determining that the criteria for issuing the request for the retry hardware function has not been met.

17. The computer program product of claim 16, wherein the program instructions further cause the computer system to:

receive, by the hardware function, the request for the retry hardware function and the unique identifier of the main hardware function from the requesting program in response to the requesting program determining that the criteria for issuing the request for the retry hardware function has been met;

execute, by the hardware function, the retry hardware function to retrieve the result of the main hardware function from the staging buffer using the unique identifier corresponding to the main hardware function in response to receiving the request for the retry hardware function and the unique identifier of the main hardware function from the requesting program; and send, by the hardware function, the result of the main hardware function retrieved from the staging buffer to the requesting program.

18. The computer program product of claim 17, wherein the program instructions further cause the computer system to:

determine, by the hardware function, whether the result has been attained from the main hardware function in response to the hardware function determining that the fixed response latency of the main hardware function has not been exceeded; and return, by the hardware function, a response with the result of the main hardware function to the requesting program to consume in response to the hardware function determining that the result has been attained from the main hardware function.

19. The computer program product of claim 14, wherein the variable response latency of the hardware function can exceed a fixed-latency response requirement of the requesting program.

20. The computer program product of claim 14, wherein the main hardware function has the fixed response latency set to an average response latency of the hardware function, and wherein the retry hardware function has a set retry response latency that is less than the fixed response latency of the main hardware function.

* * * * *